Patented Mar. 21, 1933

1,902,104

UNITED STATES PATENT OFFICE

WERNER SCHULEMANN, OF VOHWINKEL, NEAR ELBERFELD, FRITZ MIETZSCH, OF ELBERFELD, GERMANY, AND AUGUST WINGLER, OF WESTFIELD, NEW JERSEY, ASSIGNORS TO WINTHROP CHEMICAL COMPANY, INC., OF NEW YORK, N. Y., A CORPORATION OF NEW YORK

COMPOUNDS OF THE XANTHENE SERIES

No Drawing. Application filed November 15, 1929, Serial No. 407,559, and in Germany September 11, 1924.

The present invention relates to new compounds of the xanthene series, more particularly it relates to xanthenes, being at least once substituted in the benzene nuclei by a substituent of the general formula:

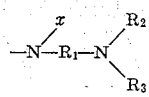

wherein $x$ stands for hydrogen, or, for example, an alkyl group, an aminoalkyl group, or substituted aminoalkyl group, such as a mono-alkyl-aminoalkyl group or dialkylaminoalkyl group, $R_1$ stands for an alkylene residue, in which the hydrogen atoms may be replaced by monovalent substituents, for example, by the hydroxy group, $R_2$ and $R_3$ stand for alkyl groups which may be substituted, for example, by an amino group, and wherein the xanthene nucleus may be further substituted, for example, by alkyl, alkoxy, phenyl, halogen and the like.

The new xanthenes are generally yellow to red products, generally sparingly soluble in water and soluble in organic solvents; they yield, with inorganic acids, water soluble bronze-colored salts and are pharmaceutically valuable products.

The manufacture of our new compounds can be effected in several ways; for instance, an amino derivative of a xanthene may be caused to be acted upon by an aminoalkyl halide having the general formula:

wherein $y$ represents a halogen atom, $R_1$ an alkylene residue the hydrogen atoms of which may be replaced by monovalent substituents, such as the hydroxy group, $R_2$ and $R_3$ stand for hydrogen or alkyl groups which may be substituted, for example, by amino groups.

Instead of the aminoalkyl halide one may use in this process the salt of an aminoalkyl which may be replaced by monovalent substituents, such as the hydroxy group, $R_2$ and $R_3$ stand for hydrogen or alkyl groups which phthalic acid is to be split off subsequently.

The manufacture of our new compounds can be furthermore effected by converting such amino compounds as are suitable intermediate products for the manufacture of amino derivatives of the xanthene into aminoalkylamino derivatives and subsequently transforming the latter into the corresponding xanthene compounds according to known methods. We are aware of the fact that several other methods for preparing our new compounds are obvious which, however, we do not mention specifically.

The following examples will illustrate our invention, without limiting it thereto:

*Example 1*

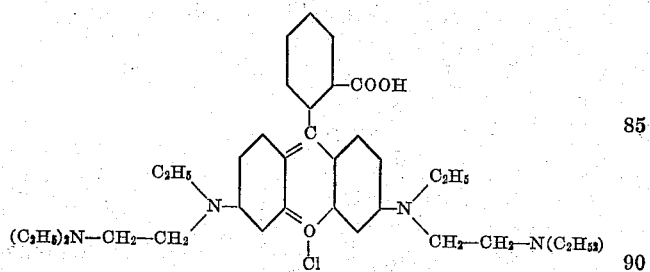

and

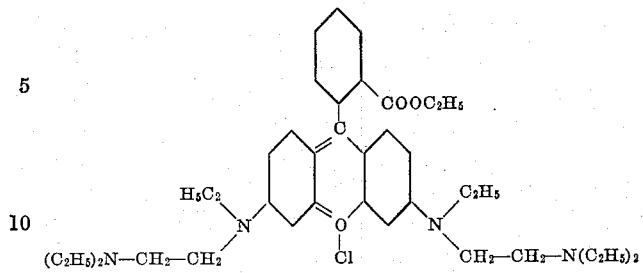

For the preparation of meta-hydroxy-N-(diethyl-amino ethyl - ethyl) - aminobenzene 102 grams of meta-oxy-N-ethylaniline are dissolved in 150 ccm of benzene on the water-bath. 100 grams of diethylamino-ethylchloride in 150 ccm of benzene are added and the whole is heated to boiling for one day. On cooling, the benzene is decanted and the free base is liberated from the aqueous layer by the addition of potassium carbonate and extracted with benzene. After the elimination of the benzene the new base distils at 180–182° C. under 4 mm pressure as a highly refractive oil which is viscous at room temperature, but on standing for several days solidifies to a white crystalline mass.

For the production of the dyestuff of the above formula 40 grams of the base are heated on an oil bath, while constantly stirring, with 50 grams of phthalic anhydride for 3 to 4 hours at a maximum temperature of 175° C. After cooling the solidified brittle melt is powdered and advantageously dissolved in nitrobenzene at 70–80° C. In order to eliminate any remaining phthalic acid and to set free the dye base, the solution is extracted several times with sodium carbonate solution at 40 to 50° C. The nitrobenzene solution is dried, diluted with ether and the dyestuff is then precipitated therefrom in the form of its hydrochloride by the addition of ethereal hydrochloric acid as a reddish brown, hygroscopic powder, which rapidly dissolves in water with a clear Rhodamine coloration.

For the esterification of the carboxyl group 10 grams of this hydrochloric acid salt are dissolved in 50 grams of absolute alcohol and hydrochloric acid gas is passed through the solution, at first for one day while cooling with ice and then for a further day while boiling the solution. On evaporating to dryness in vacuo the salt of the esterified compound is obtained; it is only distinguishable from the starting material by a slightly yellower coloration of the aqueous solution. However, the corresponding dyestuff base is more easily soluble in nitrobenzene and the coloration of this solution is remarkably much more violet than that of the unesterified base. These properties are sufficiently characteristic to distinguish the esterified dyestuff base from the unesterified base.

Other xanthene compounds can be produced in the same way.

*Example 2*

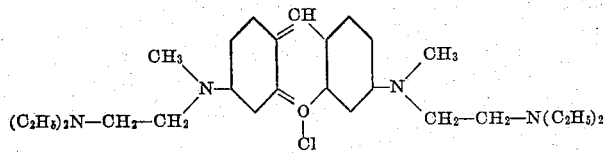

Two mols of meta-hydroxy-N-(methyl-diethylamino-ethyl)-aminobenzene are boiled together with two mols of a 50% aqueous oxalic acid and one mol of formic aldehyde in alcoholic solution during 24 hours. Thereupon water is added and the diphenylmethane compound is salted out by potassium carbonate and dissolved in benzene and the benzene is distilled off. The residue is introduced, while cooling, into 4 parts by weight of concentrated sulfuric acid and the yellowish-brown solution is heated on the water bath. It is allowed to cool to 27° C. and oxidized by adding dried sodium nitrite at 27–30° C. while stirring. The acid solution is poured on ice, and the zinc chloride salt of the dye is isolated, purified and freed from zinc.

*Example 3*

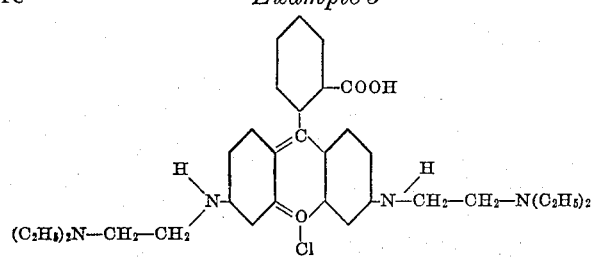

For the manufacture of meta-hydroxy-N-diethyl-aminoethyl-aminobenzene 109 grams of finely powdered meta-aminophenol are heated in 150 cc. of benzene to 70–80° C. and, while stirring, 140 grams of diethylaminoethylchloride are slowly added thereto. Finally the reaction mixture is heated for about 8 hours on a boiling water bath. After cooling the reaction mixture is dissolved with water and ether, the aqueous layer is separated and extracted several times with ether. Then potassium carbonate is added to the aqueous solution, whereby the new base is set free. The new base is dissolved in ether, the solution is dried and the ether is distilled off. The base has a boiling point of 153° C. under a pressure of 1 mm. For the formation of the xanthene compound 40 grams of the base are melted together with 50 grams of phthalic acid anhydride in the manner described in Example 1. The powdered melt is dissolved in methylene chloride; from the solution the phthalic acid is extracted by means of a potassium carbonate solution. Then ethereal hydrochloric acid is added and the hydrochloric acid salt of the xanthene derivative is precipitated by the addition of ether. It is purified by redissolving in absolute alcohol and precipitated with dry ether.

*Example 4*

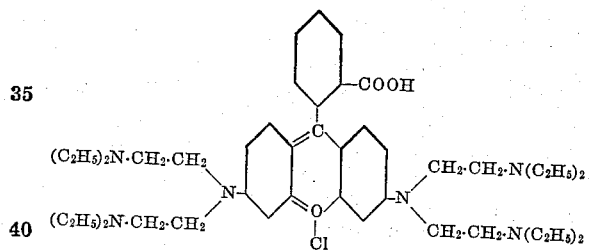

104 grams of meta-hydroxy-N-diethyl-aminoethyl-aminobenzene are heated with 70 grams of diethylaminoethyl-chloride and 100 grams of xylene for 8 hours at about 140° C. in an oil bath. The reaction mixture is dissolved in ether and diluted hydrochloric acid, the aqueous layer is separated and the free base liberated therefrom by supersaturating the aqueous layer with potash and extracting the free base with ether. After the elimination of the ether the meta-hydroxy-N-bis(diethylaminoethyl)-aminobenzene remains; it has a boiling point of 184° C. under a pressure of 1 mm.

The formation of the dyestuff is effected in the same manner as described in Example 3. A clear bluish-red dyestuff is obtained the base of which is very easily soluble in organic solvents.

This application is a continuation in part of our application Ser. No. 52,228, filed August 24, 1925, (U. S. Patent No. 1,766,403).

We claim:

1. As new products, the xanthene compounds of the probable general formula:

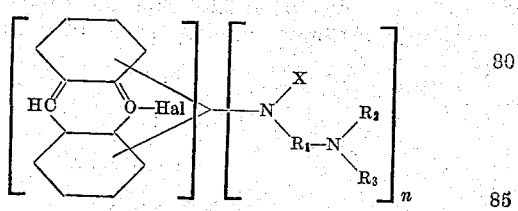

wherein X stands for a substituent of the group consisting of hydrogen, alkyl, aminoalkyl and alkylaminoalkyl, $R_1$ stands for an alkylene residue which may be substituted by hydroxyl groups, $R_2$ and $R_3$ stand for alkyl groups which may be substituted by the amino group, and, "$n$" stands for one of the numbers one and two, and wherein the nuclei may be further substituted, by substituents of the group consisting of alkyl, alkoxy, phenyl, carboxyphenyl and halogen, said compounds being generally water soluble bronze colored substances, the free bases being generally yellow to red colored, generally sparingly soluble in water, but soluble in organic solvents.

2. As a new product, the xanthene compound of the following probable formula:

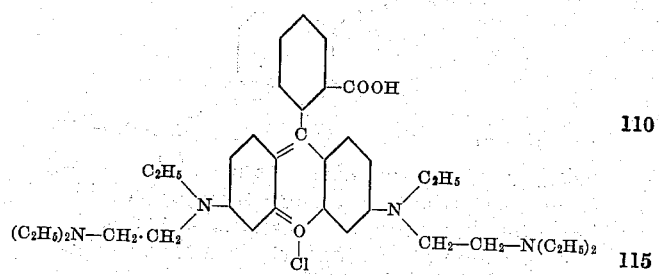

being a bronze-colored, water soluble substance, the free base being a yellowish colored substance, sparingly soluble in water, soluble in organic solvents.

3. As new products, the xanthene compounds of the probable formula:

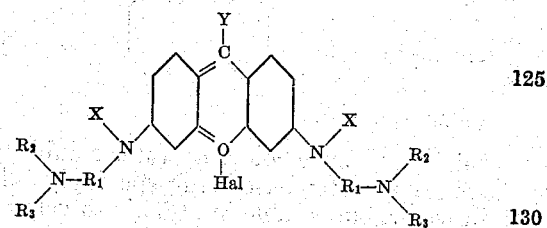

wherein X stands for a substituent of the group consisting of hydrogen, alkyl and dialkylamino-alkyl, $R_1$ stands for an alkylene residue, $R_2$ and $R_3$ stand for alkyl groups and Y respresents hydrogen or a phenyl residue containing a carboxylic acid or carboxylic acid ester group, said compounds being generally water-soluble, bronze-colored substances, the free bases being generally yellow to red colored compounds, generally sparingly soluble in water, but soluble in organic solvents.

4. As new products, the xanthene compounds of the probable general formula:

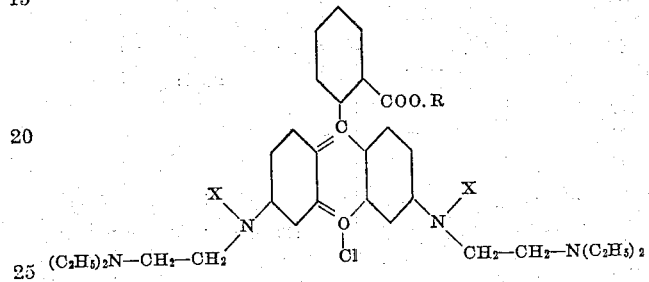

wherein X stands for hydrogen, alkyl or the residue —$CH_2$—$CH_2$—$N(C_2H_5)_2$, and R represents hydrogen or alkyl, said compounds being generally water-soluble, bronze-colored substances, the free bases being generally yellow to red colored compounds, generally sparingly soluble in water, but soluble in organic solvents.

5. As a new product, the xanthene compound of the probable formula:

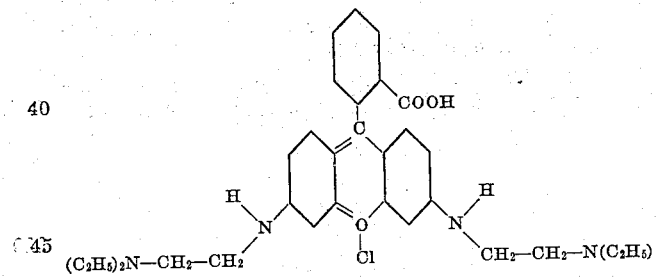

being a bronze-colored, water-soluble substance, the free base being sparingly soluble in water, but soluble in organic solvents.

6. As a new product, the xanthene compound of the probable formula:

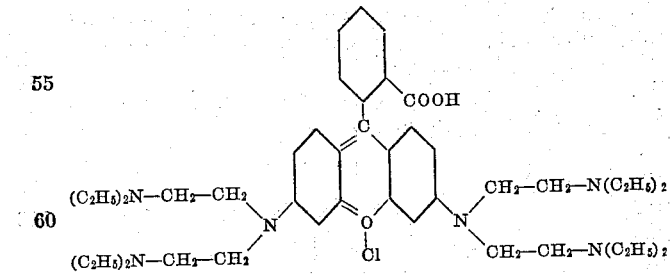

being a bronze-colored, water-soluble substance, the free base being sparingly soluble in water, but soluble in organic solvents.

In testimony whereof, we hereunto set our hands and affix our seals.
WERNER SCHULEMANN. [L. S.]
FRITZ MIETZSCH. [L. S.]
AUGUST WINGLER. [L. S.]